(12) United States Patent
Bruss

(10) Patent No.: US 6,584,795 B1
(45) Date of Patent: Jul. 1, 2003

(54) CONDENSATE DRAIN FOR AN AIR CONDITIONING SYSTEM

(75) Inventor: Paul Thomas Bruss, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/135,243

(22) Filed: Apr. 30, 2002

(51) Int. Cl.[7] .............................................. F25D 21/14
(52) U.S. Cl. ...................................................... 62/285
(58) Field of Search ........................ 62/285, 288, 289; 126/110 R; 236/DIG. 19

(56) References Cited

U.S. PATENT DOCUMENTS

| | | | |
|---|---|---|---|
| 2,728,206 A | * 12/1955 | Newton et al. ................ 62/150 |
| 3,918,271 A | 11/1975 | Whisler ......................... 62/285 |
| 4,449,511 A | 5/1984 | Hays et al. .............. 126/110 R |
| 4,623,090 A | * 11/1986 | Heger ........................ 236/49.1 |
| 4,671,076 A | * 6/1987 | Duren ........................... 62/289 |
| 4,682,579 A | 7/1987 | Bigham ................... 126/110 R |
| 4,882,911 A | * 11/1989 | Immel ........................... 62/288 |
| 4,892,045 A | 1/1990 | Schumacher ................ 110/203 |
| 4,998,412 A | * 3/1991 | Bell ............................ 62/126 |
| 5,085,244 A | 2/1992 | Funk ........................... 137/240 |
| 5,309,890 A | 5/1994 | Rieke et al. ............. 126/110 R |
| 5,364,025 A | * 11/1994 | Terry ......................... 236/49.1 |
| 5,379,749 A | 1/1995 | Rieke et al. ............ 126/110 R |
| 5,722,458 A | 3/1998 | Potter .................... 137/625.47 |
| 5,775,318 A | * 7/1998 | Haydock et al. ........ 126/110 R |
| 5,894,737 A | 4/1999 | Haeck .......................... 62/285 |

* cited by examiner

Primary Examiner—William E. Tapolcai

(57) ABSTRACT

An air conditioning system includes an air duct, an air conditioning unit in which condensation forms and a condensation drain outlet. A drain system includes a fitting having a first tube, a second tube and a third tube joined together at a common intersection. A water drain line communicates the first tube with the drain outlet. An air line communicates pressurized air from the air duct to the second tube. The third tube is communicated with the environment. The second and third tubes are oriented so that air and condensed water flow away from the intersection and through and out of the third tube. Preferably, the third tube has a down stream end which is not above its upstream end, and the first tube has a down stream end which is not above its upstream end. The tubes may form a T-shaped or a Y-shaped fitting.

9 Claims, 1 Drawing Sheet

CONDENSATE DRAIN FOR AN AIR CONDITIONING SYSTEM

BACKGROUND OF THE INVENTION

The present invention relates to a condensate drain for an air conditioning system.

Air conditioning systems normally have a condensate drain for draining away liquid water which condenses when air is cooled. In many systems, the blower which blows conditioned air into the conditioned chamber, such as a vehicle cab, is down stream of the condensate drain, so that the drain is exposed to a negative air pressure. The negative pressure in the drain line can cause air and dirt to be sucked into the system. Sucking dirt into the system lowers performance and life of the blower and sends dirt into the conditioned chamber. To prevent dirt from being sucked into the system, some systems employ a trap or a loop in the drain line to form a water trap, while others use a simple check valve. However, such loops or valves often times result in plugging of the drain line due to insufficient water flow to flush dirt out of the line. Such plugging can cause water to flow onto and damage operator enclosure floors, motors and filters.

SUMMARY

Accordingly, an object of this invention is to provide an air conditioning system condensate drain which is unlikely to plug.

Another object of this invention is to provide an air conditioning system condensate drain which does not draw exterior dirt into the drain.

These and other objects are achieved by the present invention, wherein an air conditioning system has an air duct, an air conditioning unit in which condensation forms and a condensation drain outlet. A drain system includes a fitting having a first tube, a second tube and a third tube joined together at a common intersection. A water drain line communicates the first tube with the drain outlet. An air line communicates pressurized air from the air duct to the second tube. The third tube is communicated with the environment. The second and third tubes are oriented so that air and condensed water flow away from the intersection and through and out of the third tube. Preferably, the third tube has a down stream end which is not above its upstream end, and the first tube has a down stream end which is not above its upstream end. The tubes may form a T-shaped or a Y-shaped fitting. The second tube and third tubes may extend substantially horizontally while the first tube may extend substantially vertically upwardly.

DETAILED DESCRIPTION

Figure 1:
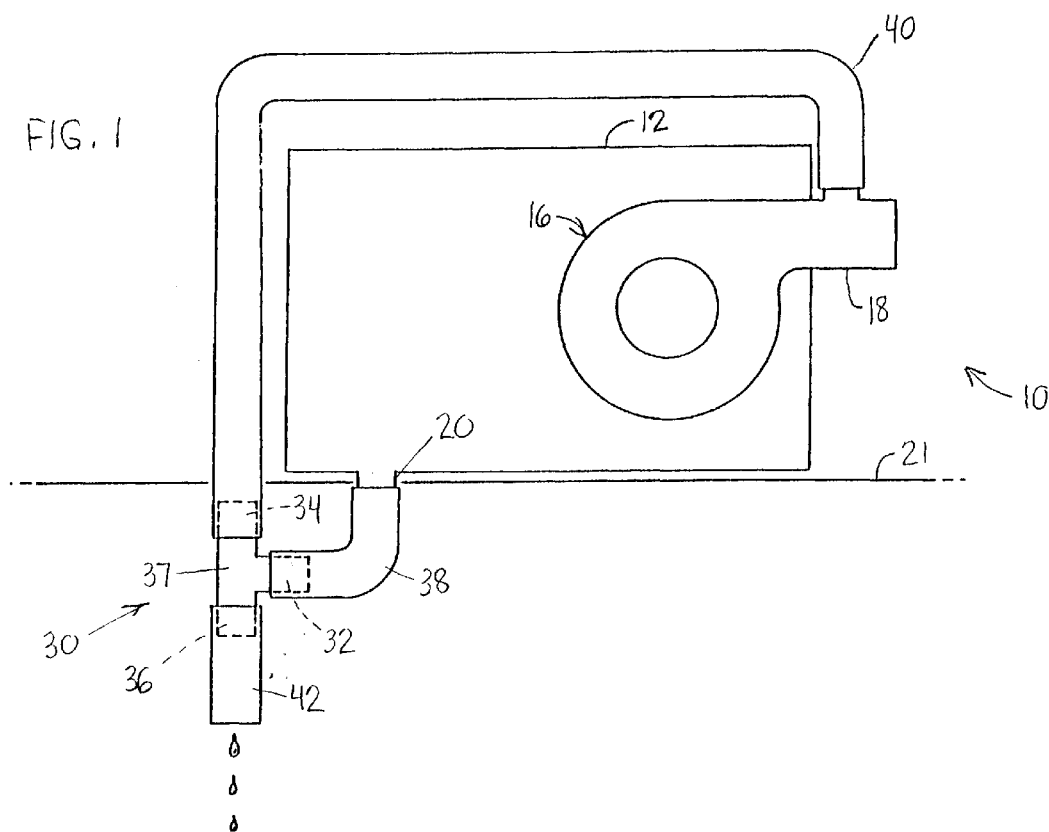
FIG. 1 is a schematic diagram of an air conditioning system embodying the present invention.

Referring to FIG. 1, an air conditioning system 10 includes an air conditioning or HVAC unit 12 which has a housing 14 which houses conventional heating and cooling units (not shown). A blower unit 16 receives conditioned air from HVAC unit 12 and discharges conditioned air to duct 18. The housing 14 forms a conventional water condensation drain outlet 20 and may be mounted above a floor 21 of a vehicle cab (not shown).

According the present invention, the condensate drain includes a fitting 30 having a first tube 32, a second tube 34 and a third tube 36 joined at an intersection 37. A first line or hose 38 communicates the drain outlet 20 to the first tube 32. A second line or hose 40 communicates pressurized air from the air duct 18 to the free end of the second tube 34. A drain line or hose 42 may be provided to communicate the free end of the third tube 36 with the environment. As shown in FIG. 1, tubes 32, 34 and 36 may form a T-shaped fitting wherein second tube 34 and third tube 36 extend away from each other and first tube 32 extends perpendicularly away therefrom.

Figure 2:
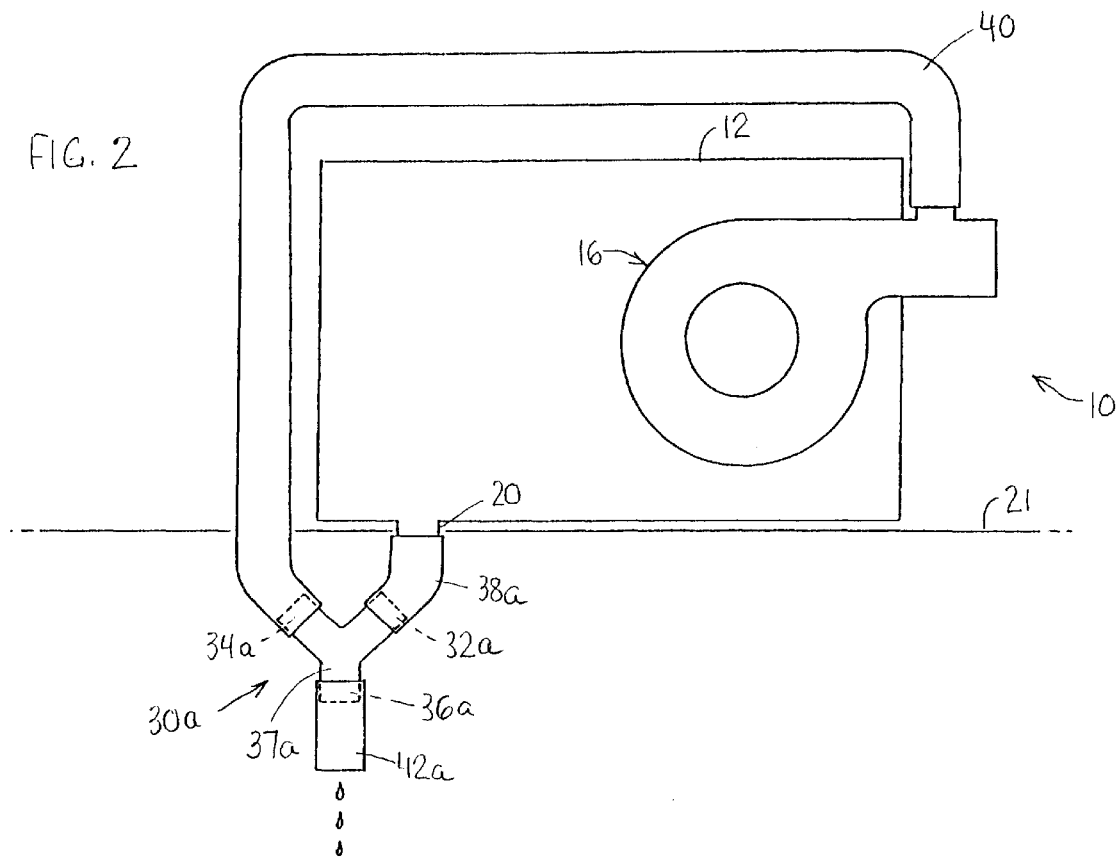
FIG. 2 is a schematic diagram of an alternate embodiment of the present invention.

Alternatively, as seen in FIG. 2, fitting 30A includes tubes 32A, 34A and 36A which may form a Y-shaped fitting wherein an angle of greater than 90 degrees is formed by the intersection of first tube 32A with third tube 36A, and an angle of greater than 90 degrees is formed by the intersection of second tube 34A with third tube 36A. Preferably, the first tube 32A and the second tube 34A are oriented with respect to each other so that air flowing from second tube 34A is unlikely to enter into first tube 32A.

In either embodiment, the three tubes may have various orientations, as long as the down stream end of third tube is not above its upstream end and as long as the down stream end of first tube is not above its upstream end.

In both embodiments condensed water and pressurized air will flow together through third tube 36, 36A, away from the intersection 37, out of the third tube and to the environment through line 42. As a result, the flow of pressurized air through third tube 36, 36A and line 42 helps to prevent dirt and debris from entering into third tube 36, 36A and line 42 from the exterior environment.

Thus, the blower 16 not only moves air into duct 18, it also pressurizes the air in duct 18. Line 40 thereby positively pressurizes the fitting 30, 30A and drain line 42. This positive pressure is not high enough to keep condensed water from flowing from outlet 20 to drain line 42, so water still drains from the HVAC unit 12. However, the positive pressure prevents air or dirt from being drawn into drain line 42 from the exterior environment. This prevents dirt from plugging any of the tubes or lines, without the need for a water trap.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a vehicle air conditioning system having an air conditioning unit in which water may condense, a blower blowing conditioned air through an air duct, a drain outlet for discharging condensed water from the air conditioning unit, a drain system comprising:

a fitting having a first tube 32, a second tube 34 and a third tube 36 joined together at a common intersection;

a water drain line communicating the first tube 32 with the drain outlet; and an air line communicating pressurized air from the air duct to the second tube, the second and third tubes being oriented so that air and condensed water flow away from the intersection and through and out of the third tube.

2. The drain system of claim 1, wherein:
the first and second tubes are oriented with respect to each other so that air blowing through the second tube does not enter into the first tube.
3. The drain system of claim 1, wherein:
the second and third tubes are oriented substantially vertically, and the first tube projects substantially horizontally away therefrom.
4. The drain system of claim 1, wherein:
the second and third tubes are extend substantially away from each other, and the first tube projects substantially perpendicularly away therefrom.
5. The drain system of claim 1, wherein:
the third tube has a down stream end which is not above its upstream end.
6. The drain system of claim 1, wherein:
the first tube has a down stream end which is not above its upstream end.
7. The drain system of claim 1, wherein:
the third tube has a down stream end which is not above its upstream end; and
the first tube has a down stream end which is not above its upstream end.
8. The drain system of claim 1, wherein:
the first, second and third tubes form a T-shaped fitting.
9. The drain system of claim 1, wherein:
the first second and third tubes form a Y-shaped fitting.

* * * * *